United States Patent [19]

Nakamura

[11] Patent Number: 5,529,827
[45] Date of Patent: Jun. 25, 1996

[54] SELF-ADHESIVE FILM

[75] Inventor: Hiroyuki Nakamura, Fukuoka, Japan

[73] Assignee: Aglis Co., Ltd., Fukuoka, Japan

[21] Appl. No.: 285,454

[22] Filed: Aug. 3, 1994

[30] Foreign Application Priority Data

Aug. 26, 1993 [JP] Japan .................................. 5-211450

[51] Int. Cl.$^6$ ............................................ D06N 7/04
[52] U.S. Cl. ................. 428/143; 428/147; 428/156; 428/172; 428/343; 428/402
[58] Field of Search .............................. 428/156, 172, 428/141, 147, 143, 343, 402, 332, 500

[56] References Cited

U.S. PATENT DOCUMENTS

| | | | |
|---|---|---|---|
| 5,004,768 | 4/1991 | Mahil et al. | 524/30 |
| 5,354,597 | 10/1994 | Capik et al. | 428/152 |

FOREIGN PATENT DOCUMENTS

| | | |
|---|---|---|
| 60-8328 | 1/1985 | Japan . |
| 63-51454 | 10/1988 | Japan . |
| 2-29290 | 6/1990 | Japan . |
| 3-22898 | 3/1991 | Japan . |
| 3-239732 | 10/1991 | Japan . |

*Primary Examiner*—Donald J. Loney
*Attorney, Agent, or Firm*—Lowe, Price, LeBlanc & Becker

[57] ABSTRACT

There is provided a film in which even if films having a self-adhesion are formed into a roll, they are peeled off without adhesion; the film can be stretched about 2 to 10 times to be wound around a grafting portion or the like simply; the wound state can be maintained; and the high success rate of grafting such as shield budding, whip and tongue graft can be maintained, said film is a soft film having a self-adhesion and having a sheet thickness of about 50 to 200 micron is molded, and minute particles in an amount of about 0.5 to 10 g/m$^2$ such as inorganic powder, plastic powder, starch, etc. having an average particle diameter of about 1 to 60 micron are scattered and adhered prior to winding. The peelability is maintained by the minute particles, and the film is stretched about 2 to 10 times and then wound whereby the self-adhesion is exhibited.

22 Claims, No Drawings

SELF-ADHESIVE FILM

BACKGROUND OF THE INVENTION

1. Field of the Invention

The present invention relates to a self-adhesive film particularly suitable for use with grafting, such as shield budding, whip and tongue graft, etc., and more specifically to a self-adhesive film which can make grafting operation easy, provides an excellent operating efficiency and maintains a high success rate of sprouting.

2. Description of the Prior Art

Recently, in the field of the fruit gardening, there is increasing severity in the economical environments. Accordingly the conversion of a harvest into fruits of high quality is now extensively being undertaken in order to conquer the competition between the fruits farmers in response to needs of higher class and variety demanded by consumers.

In general, in the grafting operation in the nursery, a method is employed in which scion buds for fruits of new plant breeding and high quality are grafted to a root stock well durable against the damage by blight and insects or change in climate. Further, a method of high worked trees (many numbers of grafting to the branches of one tree) is established as the technique for effectively switching the existing race of fruits now being produced into a new target plant breeding in order to shorten a non-harvest period for an early harvest, by which the plant breeding positively renewed.

For these grafting portions, methods which have been employed include a method for winding a self-adhesive film made of vinyl chloride tape and finally tying it; a method for using rubber strips to firmly secure the object, etc.

In this case, for protecting grafting from being dried, methods have been employed in which the whole portion thereof is covered with a plastic bag or the like, and alternatively wax cloth is used. However, in the case of vinyl chloride tapes and plastic bags, when scions are sprouting, the operation for cutting the bag open (hereafter this operation says bud-opening operation) is necessary. Since the vinyl chloride tape wound around the scions for the purpose of securing them impedes the growth of the trunk portion, the operation for removing the vinyl tape later is necessary.

Furthermore, in the case of the waxed cloth, the melted wax at a constant temperature must be prepared always. For the high worked trees conducted outdoors, this is not a suitable method in terms of difficulty of temperature management and poor operating efficiency. Also, the success rate of sprouting sometimes tends to be lowered remarkably due to being affected the operating technique, the climate conditions, etc.

For improving the above methods, a grafting method has been proposed as disclosed in Japanese Patent Publication No. 2(1990)-29290, enabling the simplification of operation in connection with the grafting operation and the remarkable enhancement of the success rate of sprouting or grafting.

That is, a film for grafting having a self-adhesive character is stretched 2 to 10 times, In case of the whip and tongue graft method, the whole scion is covered in order to secure a joined portion of grafting, and in case of the shield budding method, it is covered to seal a bud portion. Since a stretched film has a self-adhesive character in the stretched state, the final portion is placed in close contact so that tying or the like need not be done again. This simplifies the operation and completely protects the grafting portion, thus enables the remarkable enhancement of the success rate of sprouting.

Further, since the film for grafting has a deteriorating character and a moderate thickness such that the film can be bursted by the bud itself firmly germinated after the root stock and the scion have been united, the bud-opening operation is not all necessary, resulting in a substantial labor saving. Since the environment of maintaining moderate temperature and wettability are created for a given period of time by covering the entirety, this film for grafting provides various merits that it leads to early sprouting, accelerates the growth of buds, and contributes to the production of excellent plants and the growth of twigs of the scion after high worked trees.

However, there has been a problem in that since the film for grafting has the self-adhesive character, when films are placed one over another or in the form of a roll, not only they are placed in close contact with each other resulting in a difficulty of being peeled off, but also they become firmly placed in close contact due to the change with the passage of time, the change in high temperature, etc. during storage, resulting in a state of being unrolled as a single film and constituting an obstacle to a practical use.

As a method for overcoming these disadvantages as a film for grafting, there is a considered method in which the surface of the film is formed with rugged surface to mutually lower a contact area and lower a contact force. However, in the film which originally has a self-adhesive character, its contact force increases with the passage of time, which therefore is not a solution in the point of being unrolled due to the storage or the like.

Taking such problems as noted above into consideration, an easily peelable product has been proposed in which a release paper or a release film coated with a silicon resin is sandwiched and wound between films for grafting having a self-adhesive character so as to have a tape-like configuration. According to the above films, since the films having a self-adhesive character are not placed in contact with each other, they can be positively separated from each other, making it possible to help in improving the success rate of grafting as proposed in the aforementioned patent.

However, there is also a disadvantage where the release paper is used. That is, it is necessary that the films for grafting in the state of being adhered to the release paper is unrolled and cut into a desired length, and after this, the release paper and the film for grafting are separated from each other, This way of separation is unexpectedly cumbersome. The separation is difficult, because of which the films tend to be damaged, and as a result, this constitutes an obstacle to the rapid and efficient grafting operation. Furthermore, the release paper after separation is entirely waste and is often disposed at that site, giving rise to the contamination of soil and environment, The consideration and collection for not disposing them further lower the operating efficiency.

SUMMARY OF THE INVENTION

In view of the above-described problems, the present inventor has set to develop a film which is rapid and efficient in grafting operation while maintaining a level of the success rate of film having a self-adhesive character and repeatedly made various studies, as a result of which the present invention was accomplished. The present invention is intended to provide a self-adhesive film which without using a release paper, can maintain readiness of separation of films even in the case where self-adhesive films are placed one upon another or are in the form of a roll, in which when the films are wound around the object, while stretching the films maintain the wound state due to their self-adhesive character and they are not untied even if the wound distal ends are not tied.

For solving the above-described problems, according to the present invention, the conversion of conception is made such that minute particles such as earth and sand and dusts which should be exceedingly avoided because they are originally caused to lower the adhesive force are taken to be promising. Minute particles which impede the self-adhesive character which should be originally possessed dare to be adhered to films to thereby lower the adhesive force between the self-adhesive films thus materially improving the peelability of the films, In addition, this film is stretched moderately, for example, about 2 to 10 times to thereby separate off the adhered minute particles or enlarge an adhesive area, thus recovering its original self-adhesive character. According to the characteristic of the present invention, there is provided a self-adhesive film in which minute particles are adhered to a soft film having a self-adhesive character.

The above self-adhesive film is preferably constructed such that about 0.5 to 10 $g/^2$ of minute particles having 1 to 60 micron of average particle diameter are adhered to one or both surfaces of about 50 to 200 micron of a soft film having a self-adhesive character.

Further, the above-described minute particles may comprise inorganic powder, plastic powder, starch, etc.

The term 'self-adhesive film' used herein refers to a tape made of any material which has a self-adhesive character and which does not mar the adhesive character even if it is stretched moderately, for example, about 2 to 10 times. The examples of such films include olefin-family self-adhesive tapes made of paraffin wax, polyisobutylene and polyethylene, etc.

Even when the adhered minute particles are caused to lower the adhesive character and the self-adhesive films are immediately piled up one over another or wound as roll, the moderate peelability can be maintained. Therefore, the films can be simply separated and cut into the length as desired. Further, the self-adhesive film is stretched under the tensile strength at the time of separation, and the minute particles adhered during that stretching peel off or the adhesive area is widened by the stretching. Therefore, if this is wound around the object, the winding state can be maintained by the self-adhesion, and the distal ends thereof are not untied.

DETAILED DESCRIPTION OF THE INVENTION

The embodiments of the present invention will be further described in detail herein below.

The sheet thickness of the self-adhesive film is preferably about 50 to 200 micron, In the case of the olefin-family self-adhesive tape formed of paraffin wax, polyisobutylene and polyethylene, it includes about 30 to 60% (by weight, which is similarly applied to the following) of polyisobutylene, about 3 to 20% of polyethylene, and about 25 to 75% of paraffin wax. It is needless to say that this self-adhesive film may be a so-called matted film provided with rugged portions on the surface of the film.

A predetermined amount of minute particles can be scattered and adhered to one or both surfaces of the film during the process from molding to winding of the self-adhesive film. The minute particles include, for example, mica (tetrasilicon sodium), calcium carbonate, hydro zincite, magnesium oxide, talc, clay, white carbon block, calcined kieselguhr, titanium oxide, alumina, glass micro balloon, glass bead, lankozir, silasballoon, calcium sulfate, barium sulfate, inorganic minute particles of zeolite, starch, or starch subjected to surface treatment such as silicon, etylene, polystyrene, polypropylene, vinyl chloride, inorganic minute particle such as AS resin, etc. Starch, inorganic powder and plastic powder are particularly preferable.

While these minute particles are selected according to the use thereof, there is less difference caused by the stock with respect to the effect which impedes the adhesion of the film. It has been found, in the case where the minute particles are scattered on the self-adhesive film, that the remarkable effect is exhibited by relatively selecting the average particle diameter and the scattering amount of the minute particles.

That is, the average particle diameter of the minute particles is preferably about 1 to 60 micron, If the particle diameter is less than about 1 micron, the minute particles adhered to the film surface become firmly placed in close contact. For example, the interlayer separation of the self-adhesive films in the state wound in a tape-like manner is excellent. However, even after the film has been stretched about 2 to 10 times when the tape is unrolled during the use, most of the minute particles remain adhered to the film, thus failing to exhibit its original self-adhesion. On the other hand, if the particle diameter is in excess of about 60 micron, rough scattering of the particles occurs on the self-adhesive film, and some minute particles peel off from the film surface, which gives rise to a drawback that the minute particles cannot be evenly scattered.

An amount of particles to be scattered in the range of about 0.5 to 10 $g/^2$ is preferable. If the amount of scattering is less than about 0.5 $g/^2$, the peelability between the films cannot be improved, which is not preferable. On the other hand, if the amount of scattering exceeds about 10 $g/^2$, the peelability between the films can be materially improved, but when it is stretched about 2 to 10 times in the using state, the self-adhesion is not recovered, giving rise to a defect that may not meet the original object.

For the above minute particles, the amount of those having a small particle diameter is set to be from intermediate to rather much, and the amount of those having a large particle diameter is set to be from intermediate to rather less, within the aforementioned range, both of which are preferably combined. By doing so, the minute particles can be distributed between the self-adhesive films placed one upon another or wound as roll so that the particles play a role as a spacer between the mutual films providing suitable effect of impeding the adhesion of the self-adhesive films each other as well as suitable effect that when the films are stretched, the particles peel off or the adhesive area of the film increases to produce suitable effect of recovering the self-adhesion.

EXPERIMENTAL EXAMPLES

For verification of actual effectiveness of the present invention, the following experiments were conducted. Five experiments according to the present invention are illustrated in Examples 1 to 5, and Comparative Examples 1 to 10 illustrate those in which different minute particles are adhered, for the purpose of comparison, or no minute particles are adhered.

In any of the Examples and Comparative Examples, 35% of polyisobutylene having 450,000 of molecular weight in viscosity, 60% of paraffin wax having a melting point of about 65° C., and 5% of polyethylene having a specific gravity of 0.94 were evenly compounded by a pressure kneader, and a self-adhesive film of 120 micron was obtained by an extruder and then it was embossed.

The adhesion of minute particles was accomplished by sprinkling a predetermined amount of minute particles on one surface of the film using a sprinkler (Tradename: Nikka Kabushiki Kaisha Power Spray K-111) immediately before winding the self-adhesive film into a roll.

The peeling strength was measured by winding the molded self-adhesive film into a roll and leading it for 24 hours at normal temperature, and thereafter unrolling it by a tensile testing machine (Schopper) to examine an 'initial' peeling strength. The roll-like film is stored in a gear oven at 55° C. for 7 days, after which similar measurement was done to examine a peeling strength in a state where a 'heating accelerating' state, namely, a change with the passage of time is imagined.

The self-adhesive films marketed after passage of suitable days were actually used. It is also ordinary that those subjected to changing of temperature environment are used. Thus, the result of experiment of the peeling by the latter into which consideration of the change with the passage of time is taken out of the aforementioned two measurements will be a conclusive factor in determining the presence or absence of the practicality.

Further, the film after the heating accelerating of the above-mentioned latter measurement was used. The scion was grafted to the stock of a trifoliate orange, around which the film was wound while stretching it about 5 times to effect grafting operation (whip and tongue graft method). The number of graftings per minute (workability) was compared.

(Example 1)

3 g/m² glass beads of having 20 micron of average particle diameter were scattered as minute particles to provide a self-adhesive film.

(Example 2)

5 g/m² of calcium carbonate having 10 micron of average particle diameter were scattered.

(Example 3)

4 g/m² of starch having 15 micron of average particle diameter were scattered.

(Example 4)

1 g/m² of starch having 40 micron of average particle diameter were scattered.

(Example 5)

0.7 g/m² of polypropylene having 50 micron of average particle diameter were scattered.

(Comparative Example 1)

5 g/m² of glass beads having 0.8 micron of average particle diameter were scattered.

(Comparative Example 2)

1.2 g/m² of alumina having 80 micron of average particle diameter were scattered.

(Comparative Example 3)

0.3 g/m² of calcium carbonate having 20 micron of average particle diameter were scattered.

(Comparative Example 4)

12 g/m² of calcium carbonate having 10 micron of average particle diameter were scattered.

(Comparative Example 5)

0.4 g/m² of starch having 15 micron of average particle diameter were scattered.

(Comparative Example 6)

12 g/m² of starch having 30 micron of average particle diameter were scattered.

(Comparative Example 7)

1.5 g/m² of polypropylene having 0.3 micron of average particle diameter were scattered.

(Comparative Example 8)

0.4 g/m² of polypropylene having 70 micron of average particle diameter were scattered.

(Comparative Example 9)

A self-adhesive film with minute particles not scattered was used.

(Comparative Example 10)

A self-adhesive film with minute particles not scattered was used, it wound into a roll with release paper processed with silicon.

The results of the above experiments were given in Table 1.

The mark "XX" appearing in the column of remarks in the Table 1 indicates that when the film is pulled out of the roll at the time of grafting operation, the film is in a state of adhesion so that the peelability is poor, and therefore, when an attempt is made to peel the film, the film becomes excessively extended so that the film is hard to be wound or becomes cut making the grafting operation extremely difficult, or the rate of loss of the film is very high, and those which are completely impossible to be separated, thus losing the practicality.

Further, the mark "*" indicates that when the film is stretched for the purpose of effecting grafting operation, the self-adhesion is rarely present so that the grafting operation is impossible.

The Comparative Examples 1, 5, and 10 were materially poor in workability as compared with the Examples of the present invention and were inferior in practicality to the present invention, but the operation could be carried out.

Grafting could be done due to the protective effect of the film itself but the success rate of grafting was high.

It has been found in connection with the extent of peeling for preferable workability that according to the above-described experiments, the peeling strength in excess of 50 to 60 g/cm in the initial state is preferable, when the peeling strength exceeds about 350 to 400 g/10 cm² in the heating accelerating state, the workability is materially impeded.

As will be apparent from the results shown in Table 1, by using the self-adhesive film according to the present invention, the workability was materially improved, and in addition, since this film protected the scion and the stock of the trifoliate orange, nearly 10096 of the success rate of grafting could be obtained.

TABLE 1

|  | PEELING STRENGTH (g/cm) | | GRAFTING RESULTS | |
| --- | --- | --- | --- | --- |
|  | Initial | Heating accelerating | Workability (No./min) | Remarks |
| Exa. 1 | 65 | 80 | 6 |  |
| Exa. 2 | 58 | 75 | 6.5 |  |
| Exa. 3 | 40 | 60 | 6 |  |
| Exa. 4 | 80 | 115 | 6 |  |
| Exa. 5 | 83 | 125 | 5.5 |  |
| Comp. |  |  |  |  |
| Exa. 1 | 40 | 380 | 3 |  |
| Exa. 2 | 58 | 630 | 1 | XX |
| Exa. 3 | 60 | 680 | 1 | XX |
| Exa. 4 | 0 | 20 | — | * |
| Exa. 5 | 60 | 450 | 2 |  |
| Exa. 6 | 10 | 25 | — | * |
| Exa. 7 | 57 | 660 | 1 | XX |
| Exa. 8 | 65 | 700 | 1 | XX |
| Exa. 9 | 90 | Peeling impossible | — | XX |
| Exa. 10 | — | — | 3 |  |

As described above, according to the present invention, there is provided a self-adhesive film in which even if self-adhesive films are placed one upon another or formed into a roll, the readiness of peeling can be maintained, and the film can be stretched to cover the object; the stretched film has the self-adhesion even if it was stretched and the covered state can be maintained; the final portion becomes placed in close contact; tying or the like need not be made again; and the simplification of operation can be attained; there is further provided a self-adhesive film in which if it is used for grafting, the grafting portion can be completely protected so that the success rate of grafting can be materially improved. In addition, since no release paper or the like is used, no waste occurs.

I claim:

1. A self-adhesive film in which minute particles are adhered to at least one surface of a soft film having a self-adhesive character and which can be easily stretched in the range of about 2 to 10 times, wherein said film has a thickness of about 50 to 200, wherein when the said film is moderately stretched in the range of about 2 to 10 times, an adhesive area of the film is enlarged, whereby the self-adhesive film recovers its self-adhesive character.

2. A self-adhesive film in which minute particles are adhered to at least one surface of a soft film having a self-adhesive character and which can be easily stretched in the range of about 2 to 10 times wherein said film has a thickness of about 50 to 200 micron, wherein when the film is moderately stretched in the range of about 2 to 10 times, the particles peel off, whereby the self-adhesive film recovers its self-adhesive character.

3. A self-adhesive film according to claim 1 wherein the minute particles are selected from the group consisting of starch, inorganic powder, plastic powder and mixtures thereof.

4. A self-adhesive film according to claim 2 wherein the minute particles are selected from the group consisting of starch, inorganic powder, plastic powder and mixtures thereof.

5. A self-adhesive film according to claim 1 wherein said film has a surface formed with rugged portions in the form of an embossment.

6. A self-adhesive film according to claim 2 wherein said film has a surface formed with rugged portions in the form of an embossment.

7. A self-adhesive film according to claim 3 wherein said film has a surface formed with rugged portions in the form of an embossment.

8. A self-adhesive film according to claim 1 wherein about 0.5 to 10 $g/m^2$ of minute particles having 1 to 60 micron of average particle diameter are adhered to at least one surface of a soft film exhibiting self-adhesion.

9. A self-adhesive film according to claim 2 wherein about 0.5 to 10 $g/m^2$ of minute particles having 1 to 60 micron of average particle diameter are adhered to at least one surface of a soft film exhibiting self-adhesion.

10. A self-adhesive film according to claim 3 wherein about 0.5 to 10 $g/m^2$ of minute particles having 1 to 60 micron of average particle diameter are adhered to at least one surface of a soft film exhibiting self-adhesion.

11. A self-adhesive film according to claim 4 wherein about 0.5 to 10 $g/m^2$ of minute particles having 1 to 60 micron of average particle diameter are adhered to at least one surface of a soft film exhibiting self-adhesion.

12. A self-adhesive film according to claim 1 wherein the said film is made of material comprising paraffin wax, polyisobutylene and polyethylene.

13. A self-adhesive film according to claim 2 wherein the said film is made of material comprising paraffin wax, polyisobutylene and polyethylene.

14. A self-adhesive film according to claim 3 wherein the said film is made of material comprising paraffin wax, polyisobutylene and polyethylene.

15. A self-adhesive film according to claim 4 wherein the said film is made of material comprising paraffin wax, polyisobutylene and polyethylene.

16. A self-adhesive film according to claim 5 wherein the said film is made of material comprising paraffin wax, polyisobutylene and polyethylene.

17. A self-adhesive film according to claim 6 wherein the said film is made of material comprising paraffin wax, polyisobutylene and polyethylene.

18. A self-adhesive film according to claim 7 wherein the said film is made of material comprising paraffin wax, polyisobutylene and polyethylene.

19. A self-adhesive film according to claim 8 wherein the said film is made of material comprising paraffin wax, polyisobutylene and polyethylene.

20. A self-adhesive film according to claim 9 wherein the said film is made of material comprising paraffin wax, polyisobutylene and polyethylene.

21. A self-adhesive film according to claim 10 wherein the said film is made of material comprising paraffin wax, polyisobutylene and polyethylene.

22. A self-adhesive film according to claim 11 wherein the said film is made of material comprising paraffin wax, polyisobutylene and polyethylene.

* * * * *